(12) United States Patent
Shiotsu et al.

(10) Patent No.: US 7,902,773 B2
(45) Date of Patent: Mar. 8, 2011

(54) LIGHT EMITTING DEVICE

(75) Inventors: Fuminori Shiotsu, Shizuoka (JP);
Takanori Namba, Shizuoka (JP);
Masayasu Ito, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 607 days.

(21) Appl. No.: 12/025,873

(22) Filed: Feb. 5, 2008

(65) Prior Publication Data
US 2008/0197789 A1 Aug. 21, 2008

(30) Foreign Application Priority Data
Feb. 15, 2007 (JP) ................................. 2007-034700

(51) Int. Cl.
*H05B 39/04* (2006.01)
(52) U.S. Cl. .......... 315/318; 315/320; 315/312; 315/297
(58) Field of Classification Search ............ 315/77, 315/82, 80, 247, 291, 297, 307, 224, 312, 315/318, 320; 340/457.2, 457.3, 457.4, 815.45; 345/45, 77; 362/611, 612; 307/10.8
See application file for complete search history.

(56) References Cited

U.S. PATENT DOCUMENTS

| | | | | |
|---|---|---|---|---|
| 6,847,169 B2 * | 1/2005 | Ito et al. | ........................... | 315/77 |
| 6,972,674 B2 * | 12/2005 | Ohmi | ............................ | 340/458 |
| 7,002,458 B2 * | 2/2006 | Su | ................................ | 340/465 |
| 7,403,107 B2 * | 7/2008 | Ito et al. | ........................ | 340/458 |
| 7,414,524 B2 * | 8/2008 | Ito et al. | ........................ | 340/469 |
| 7,521,667 B2 * | 4/2009 | Rains et al. | .................. | 250/228 |

FOREIGN PATENT DOCUMENTS
JP 2006-073400 3/2006
* cited by examiner

*Primary Examiner* — Haissa Philogene
(74) *Attorney, Agent, or Firm* — Fish & Richardson P.C.

(57) ABSTRACT

A light emitting device includes multiple light units each of which includes a semiconductor light source, and a current supply control means for controlling supply of current to the semiconductor light source. A control unit includes a control signal generation means for generating and providing a control signal. The light emitting device also includes switching means for controlling feeding from a DC power source to a corresponding one of the light units in response to the control signal. Each of the switching means is coupled to a corresponding one of the light units through a feed line.

6 Claims, 8 Drawing Sheets

LIGHT EMITTING DEVICE

This application is based on and claims priority from Japanese Patent Application No. 2007-034700, filed on Feb. 15, 2007, the entire contents of which are hereby incorporated by reference.

BACKGROUND

1. Technical Field

The present disclosure relates to a light emitting device, and more particularly, relates to a light emitting device used as a vehicle lamp.

2. Background

Conventionally, vehicle lamps using a semiconductor light emitting element such as Light Emitting Diodes (LEDs) as a light source have been known. When LEDs are used as a light source for vehicle lamps, a lamp constitutes the eye of a vehicle, and the aspect of the design is regarded as important Thus, the specifications thereof can be classified into a wide variety of types. For example, different vehicles (e.g., car models) have different numbers of LEDs to be used, different shapes and sizes of the lamp itself or different configurations of the lighting control circuit of the vehicle lamp for turning the light on/off, and for controlling the brightness of each LED. Thus, there may be many variations thereof.

In cases where one-to-one circuit development is carried out for the different configurations, huge development costs inevitably are required. For example, to configure a system where one circuit is adapted to multiple LEDs, the driving circuit must be configured according to the type of the LEDs or according to the car model. Thus, an increase in cost of the product is incurred with an increase in circuit development cost.

Under such circumstances, there has been proposed a system adopting the following configuration so as to attain standardization, reduction of development cost, and cost reduction. Multiple light units each including a LED, a switching regulator and a control circuit are provided. In addition, a control unit includes an input circuit for supplying a DC power source from a battery to each light unit, a microcomputer for controlling each light unit, and a peripheral circuit. Thus, the control unit and each of the light units are connected through a feed line and a communication line (see e.g., Japanese Unexamined Patent Publication: JP-A-2006-73400).

According to JP-A-2006-73400, the control unit and each of the light units are connected to each other through a communication line as well as a feed line. Therefore, the operation for wiring the feed line and the communication line becomes more complicated with an increase in the number of light units, resulting in an increase in cost and an increase in the number of mounting steps. In this case, to simplify the wiring of the communication line, a serial communication system such as a Local Interconnect Network (LIN) is employed. However, when this kind of serial communication system is employed, it is necessary to assign an address to each light unit, which makes standardization more difficult.

SUMMARY

The present invention provides a light emitting device that, in some implementations, can attain standardization of the whole system, reduction of the number of mounting steps, and cost reduction using a feed line as a communication line.

For example, according to one aspect of the present invention, a light emitting device includes light units each of which includes a semiconductor light source and a current supply control means for controlling supply of current to the semiconductor light source. A control unit includes a control signal generation means for generating and outputting a control signal, and first switching means for controlling feed from a DC power source to a corresponding one of the light units in response to the control signal. Each of the first switching means is coupled to a corresponding one of the light units through a feed line.

According to the foregoing configuration, the control unit is coupled to multiple light units through multiple feed lines. In each of the feed line, there are multiple switching means for controlling the feeding to each of the light units from a DC power source in response to a control signal. Therefore, even without providing a communication line other than the feed lines, it is possible to control the turning on/off and dimming (attenuating) of the semiconductor light source in each of the light units through the switching operation of each of the switching means. This can achieve standardization of the whole system, reduction of the number of mounting steps, and cost reduction.

Various implementations can include one or more of the following features. For example, when the feeding from the feed line is stopped through a switching operation of each of the switching means, the current supply control means stops a control operation thereof and stores electric charges resulting from the feeding during a feed stop period.

The foregoing configuration can prevent an increase in loss involved in discharge of electric charges during the feed stop period, or a reduction of the linearity with respect to the light quantity due to time delay of the control operation upon start of the feeding.

In some implementations, each of the light units further includes a second switching means connected in series to the semiconductor light source, and a switch control means for controlling the second switching means in an OFF state during a feed stop period when the feeding from the feed line is stopped by a switching operation of each of the first switching means. The current supply control means stores electric charges resulting from the feeding during the feed stop period.

The foregoing configuration also can prevent an increase in loss involved in discharge of electric charges during the feed stop period, or a reduction of the linearity with respect to the light quantity resulting from the time delay of the control operation upon completion of feeding.

In some implementations, the current supply control means includes a noise filtering coil for removing a switching noise from the feed line and detects stoppage of the feeding from the feed line through the switching operation of each of the first switching means from a change in applied voltage of the noise filtering coil.

According to the foregoing configuration, when the feeding from the feed line to the semiconductor light source is stopped, the voltage across the coil sharply changes in accordance with the constant current operation of the noise filtering coil. Therefore, in the current supply control means of each of the light units, by monitoring a change in the applied voltage of the coil, it is possible to detect stoppage of the feeding from the feed line to the semiconductor light source.

In some cases, the control unit further includes an abnormality determining means for determining whether each of the light unit is in an abnormal state based on a value of current flowing through each of the first switching means.

According to the foregoing configuration, it is possible to determine whether each light unit is in an abnormal state in the control unit without connecting between the control unit and the light unit through a communication line.

Other features and advantages of the present invention will be apparent from the following detailed description, the drawings and the claims.

DETAILED DESCRIPTION

Various embodiments of the invention are described below with reference to the accompanying drawings.

First Example

Figure 1:
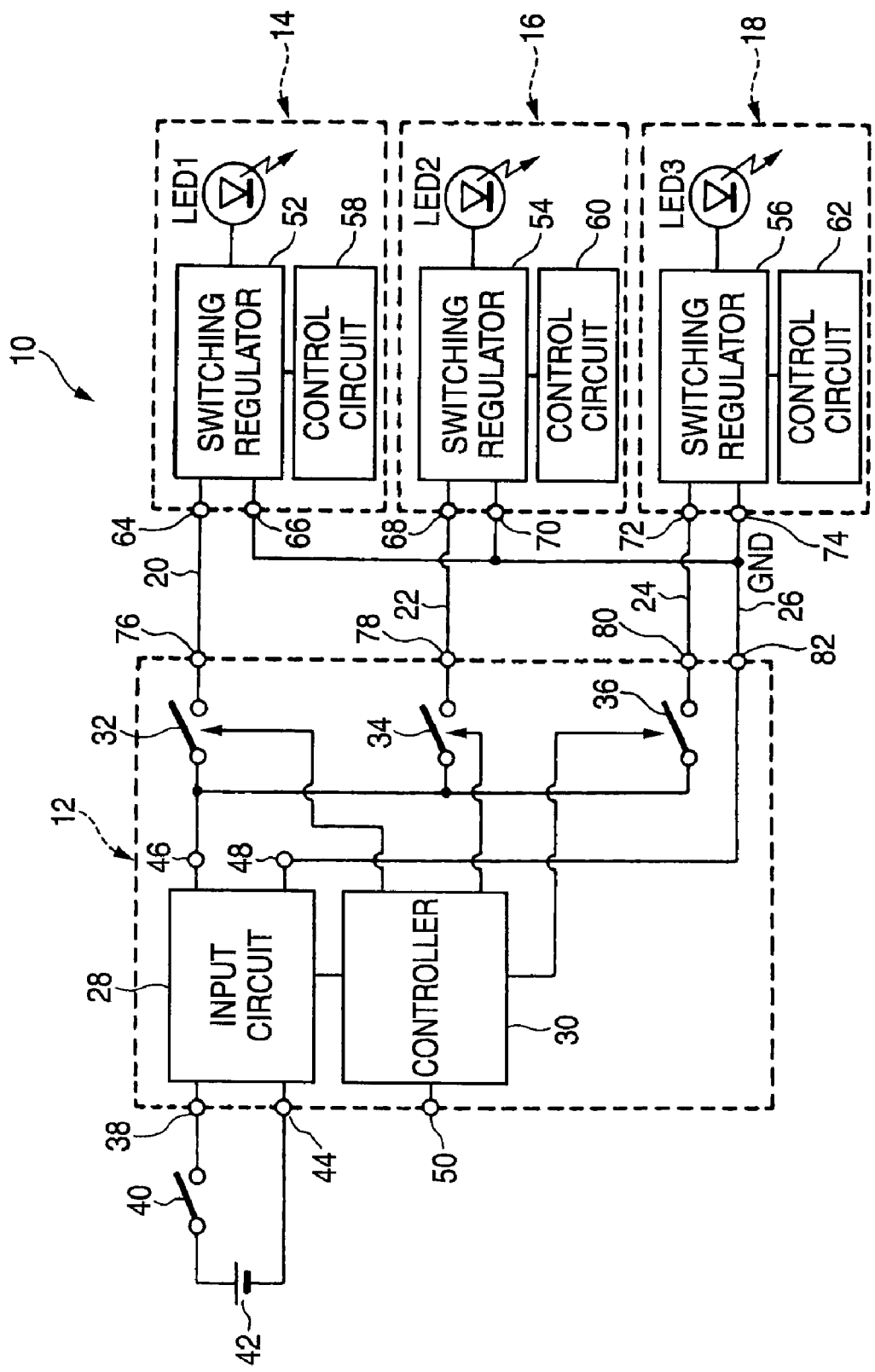
FIG. 1 is a block diagram showing a light emitting device according to a first example of the present invention.

In FIG. 1, a light emitting device 10 includes a control unit 12, and light units 14, 16 and 18. The control unit 12 and respective light units 14, 16 and 18 are connected through feed lines 20, 22, 24 and 26.

The control unit 12 includes an input circuit 28, a controller 30 including a microcomputer and a peripheral circuit thereof and switching elements 32, 34 and 36.

Figure 2:
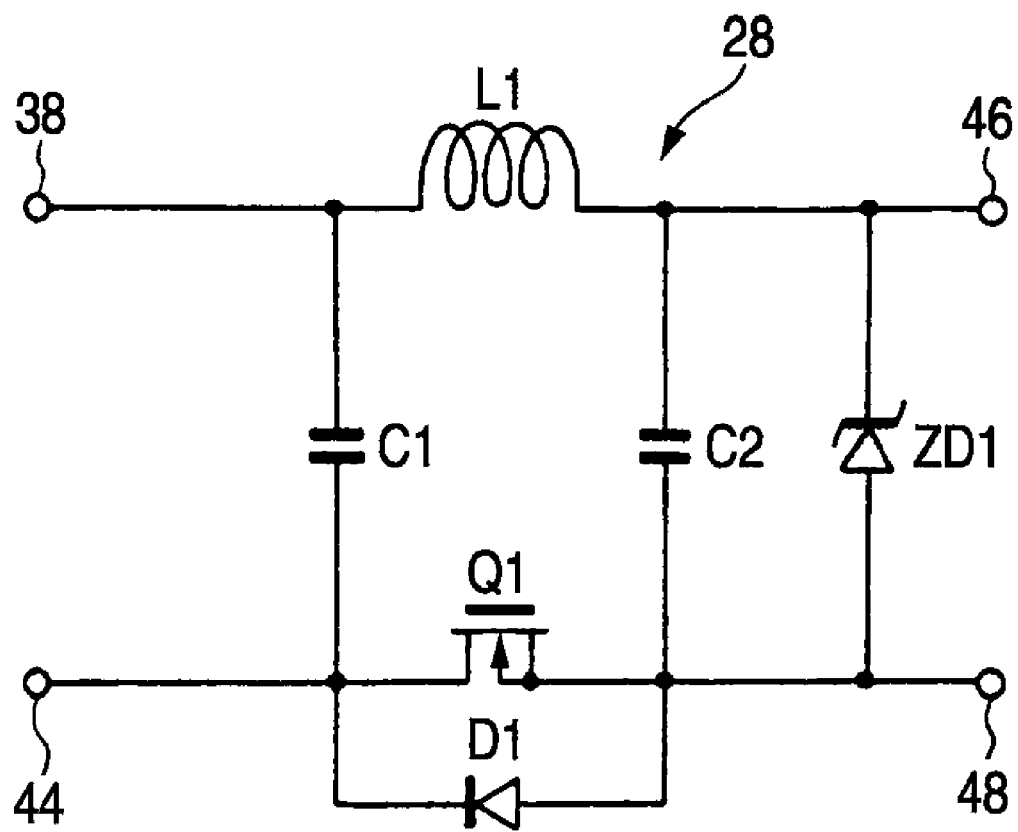
FIG. 2 is a circuit diagram showing an input circuit.

The input circuit 28 includes, for example, as shown in FIG. 2, a Zener diode ZD1 as a surge voltage protective element, capacitors C1 and C2 and a coil L1 as an input filter, an NMOS transistor Q1 as a reverse connection protective element, and a parasitic diode D1 thereof. An input terminal 38 is connected to the positive (+) terminal of a battery (DC power source) 42 through a switch 40. An input terminal 44 is connected to the negative (−) terminal of the battery 42. An output terminal 46 is connected to the feed lines 22, 24 and 26 of direct current voltage (high voltage side). An output terminal 48 is connected to the feed line 26 of GND (low voltage side).

The controller 30 includes a microcomputer (microprocessor) having a CPU, a ROM, a RAM, or the like, and a peripheral circuit thereof (input output interface circuit). It is configured as a control signal generation means. The control signal generation means receives information on the vehicle communication from an input/output terminal 50, captures the information (output voltage) on the state of the input circuit 28 from the input circuit 28, generates a control signal corresponding to turning on/off or dimming (attenuation) as transmitting information on respective light units 14, 16 and 18 based on the received information, and then outputs the generated control signal to the switching elements 32, 34 and 36.

The control signal for turning on/off light is generated as a signal for turning on/off the switching elements 32, 34 and 36. A control signal for dimming (attenuation) is generated, for example, as a Pulse Width Modulation (PWM) signal because the switching elements 32, 34 and 36 are required to be turned on/off at high speed so as to repeat the supplying/stopping supplying to respective light units 14, 16 and 18, and thereby to turn on/off LED 1, LED 2 and LED 3 in respective light units 14, 16 and 18 at high speed. When PWM dimming is performed using PWM signals, the frequency of the PWM signal should be within the range of several hundreds of hertz (Hz) to several kilohertz (KHz) in light of the prevention of visual flickering (turning on and off) recognition, the relationship of the linearity between the duty and the light quantity, energy loss, and the adverse effect on the radio noise.

Each of the switching elements 32, 34 and 36 corresponds to a respective one of the light units 14, 16 and 18. The switching elements 32, 34 and 36 are connected to the input circuit 28 and the feed lines 20, 22 and 24. Thus, these are configured as first switching means for opening and closing the feed lines 20, 22 and 24 by a switching operation (ON/OFF operation) in response to a control signal from the controller 30, and controlling the feed from the battery 42 to the light units 14, 16 and 18. Semiconductor elements such as PMOS or NMOS transistors, or bipolar transistors, for example, can be used as the switching elements 32, 34 and 36.

The light units 14, 16 and 18 include switching regulators 52, 54 and 56, and control circuits 58, 60 and 62, and light emitting diodes LED1, LED2 and LED3, respectively. An input terminal 64 of the switching regulator 52 is connected to the feed line 20. An input terminal 66 is connected to the feed line 26. An input terminal 68 of the switching regulator 54 is connected to the feed line 22. An input terminal 70 is connected to the feed line 26. An input terminal 72 of the switching regulator 56 is connected to the feed line 24. An input terminal 74 is connected to the feed line 26. The feed lines 20, 22, 24 and 26 are connected to the output terminals 76, 78, 80 and 82 of the control unit 12, respectively.

The switching regulators 52, 54 and 56 receive DC electric power from the feed lines 20 to 26, and thus are configured as a current supply control means for controlling supply of current to the light emitting diodes LED1, LED2 and LED3 with the control circuits 58, 60 and 62.

Figure 3:
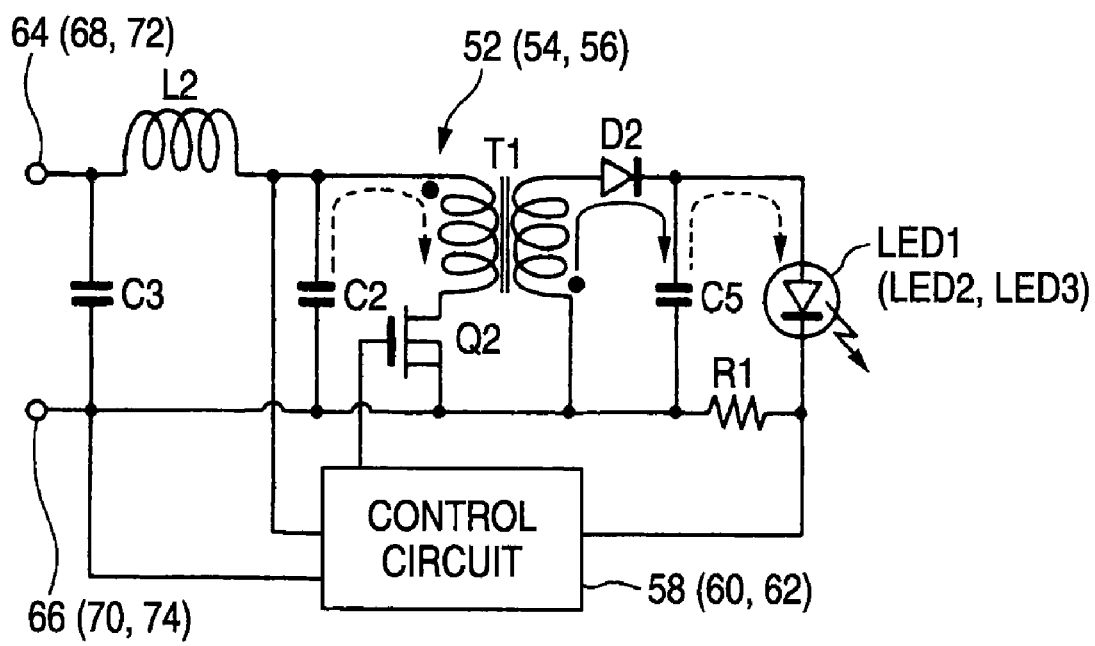
FIG. 3 is a circuit diagram showing a switching regulator and a control circuit according to the first example.

Specifically, the switching regulator 52, 54 or 56 is, as shown in FIG. 3, configured as a Flyback-Type switching regulator and include a coil L2, capacitors C3 and C4, an NMOS transistor Q2, a transformer T1, a diode D2, a capacitor C5, a shunt resistance R1, and the control circuit 58 (60 or 62). The node between the shunt resistance R1 and the light emitting diode LED1 (LED2 or LED3) is connected to a current detection terminal (not shown) of the control circuit 58 (60 or 62). One end side of the shunt resistance R1 is grounded through the feed line 26. The shunt resistance R1 is configured so as to convert the current flowing through the light emitting diode LED1 (LED2 or LED3) into a voltage, and feed back the converted voltage to the current detection terminal of the control circuit 58 (60 or 62). The control circuit 58 (60 or 62), which is composed of an integrated circuit (IC), serves as a functional unit, generates a switching signal (pulse signal) in accordance with a program, and then applies the generated switching signal (pulse signal) as a control signal to the NMOS transistor Q2. Thus, the control circuit controls the switching operation of the NMOS transistor Q2 so that, for example, the voltage of the current detection terminal becomes a constant voltage, namely, the current IF flowing through the light emitting diode LED1 (LED2 or LED3) becomes constant.

The coil L2 and the capacitors C3 and C4 form a π-Type noise filter for removing the switching noise of the feed lines 20 to 26, so as to smooth a DC voltage from the input circuit 28 and apply the smoothed direct current voltage to the first side of the transformer T1. When the DC voltage is applied to the transformer T1, the NMOS transistor Q2 performs a switching operation in response to a switching signal. For example, when the NMOS transistor Q2 is turned on, the smoothed DC voltage is stored as an electromagnetic energy in the first wiring of the transformer T1. Then, when the NMOS transistor Q2 is turned off, the stored electromagnetic energy is discharged from the second wiring of the transformer T1. The discharged electromagnetic energy is rectified at the diode D2, and smoothed at the capacitor C4 so as to be converted into a DC voltage. In particular, the DC voltage provided to the switching regulators 52, 54 and 56 is converted into an electromagnetic energy, and then converted into a DC power, so as to be supplied to the light emitting diodes LED1 (LED2 and LED3). In addition, a boot-up type or a boot-down type can be used as the switching regulator 52, 54 or 56, in addition to the Flyback-Type switching regulator.

The light emitting diodes LED1, LED2 and LED3 are inserted as semiconductor light sources in the output loop of the switching regulators 52, 54 and 56. As the light emitting diode LED1, LED2 or LED3 constituting the semiconductor light source, not only a single one, but also multiple ones can be used. In addition, multiple parallel-connected light source blocks also can be used, where the light source block is composed of series-connected LEDs. Alternatively, the light emitting diodes LED1 to LED3 can be configured as a light source of various vehicle lamps such as a head lamp, a stop and tail lamp, a fog lamp, or a turn signal lamp.

In the example, by applying a control signal (pulse signal) with an on-duty of 100% from the controller 30 to respective switching elements 32, 34 and 36, it is possible to turn on the light emitting diodes LED1, LED2 and LED3 of respective light units 14, 16 and 18. By applying a control signal (pulse signal) with an on-duty of 0% from the controller 30 to respective switching elements 32, 34 and 36, it is possible to turn off the light emitting diodes LED1, LED2 and LED3 of respective light units 14, 16 and 18. On the other hand, by applying, for example, a PWM signal with an on-duty of 50% as a control signal from the controller 30 to respective switching elements 32, 34 and 36, it is possible to dim (attenuate) the light emitting diodes LED1, LED2 and LED3 of respective light units 14, 16 and 18.

Therefore, even without connecting the control unit 12 and respective light units 14, 16 and 18 through a communication line in addition to the feed lines 20 to 26, or even without assigning addresses to respective light units 14, 16 and 18, it is possible to control turning on/off and dimming (attenuating) of the light emitting diodes LED1, LED2 and LED3 of respective light units 14, 16 and 18 in the following manner. A control signal is applied to respective switching elements 32, 34 and 36 from the controller 30 to control the ON/OFF operations of respective switching elements 32, 34 and 36.

Figure 4:
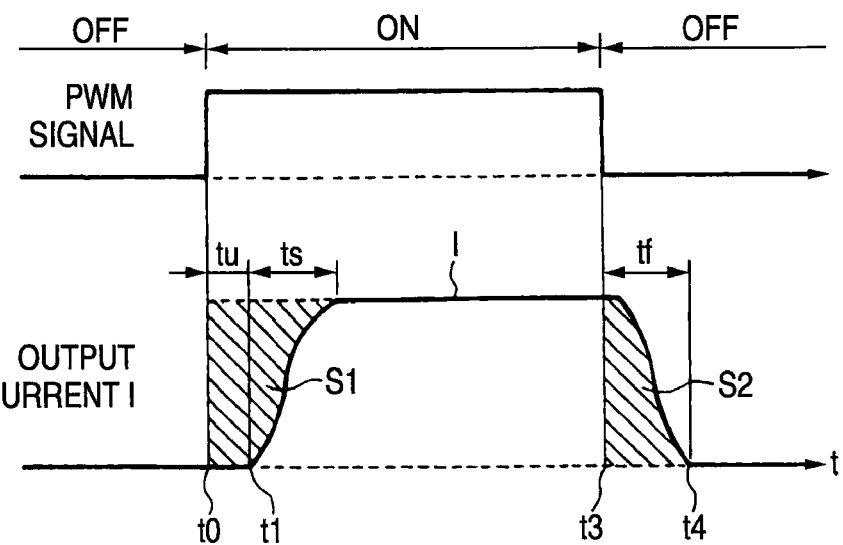
FIGS. 4A and 4B are waveform charts showing the relationship between the PWM signal and the output current of the switching regulator.

When the switching regulators 52, 54 and 56 are in a continuously operable condition, dimming (attenuation) is performed on the light emitting diodes LED1, LED2 and LED3 of respective light units 14, 16 and 18 using a PWM signal. Then, as shown in FIG. 4A, the switching elements 32, 34 and 36 of the control unit 12 shift from OFF to ON (the feed lines 20, 22 and 24 shift from a low level to a high level) at a time t0 in response to the PWM signal. As a result as shown in FIG. 4B, the control circuits 58, 60 and 62 in the light units 20, 22 and 24 start up at a time t1, so that a time delay "tu" occurs until start-up of the control circuits 58, 60 and 62. Thereafter, when a current is supplied from the switching regulators 52, 54 and 56 to the light emitting diodes LED1, LED2 and LED3, the output current I of the switching regulators 52, 54 and 56 gradually increases while the transient state "ts" is present.

On the other hand, the switching elements 32, 34 and 36 of the control unit 12 shift from OFF to ON (the feed lines 20, 22 and 24 shift from a low level to a high level) at a timing t2 in response to the PWM signal. Then, as shown in FIG. 4B, the control circuits 58, 60 and 62 in the light units 14, 16 and 18 stop their operations at a time t3. As a result, a time delay "tf" occurs until the feeding of current to the light emitting diodes LED1, LED2 and LED3 ceases (until the output current I of the switching regulators 52, 54 and 56 becomes 0).

Figure 5:
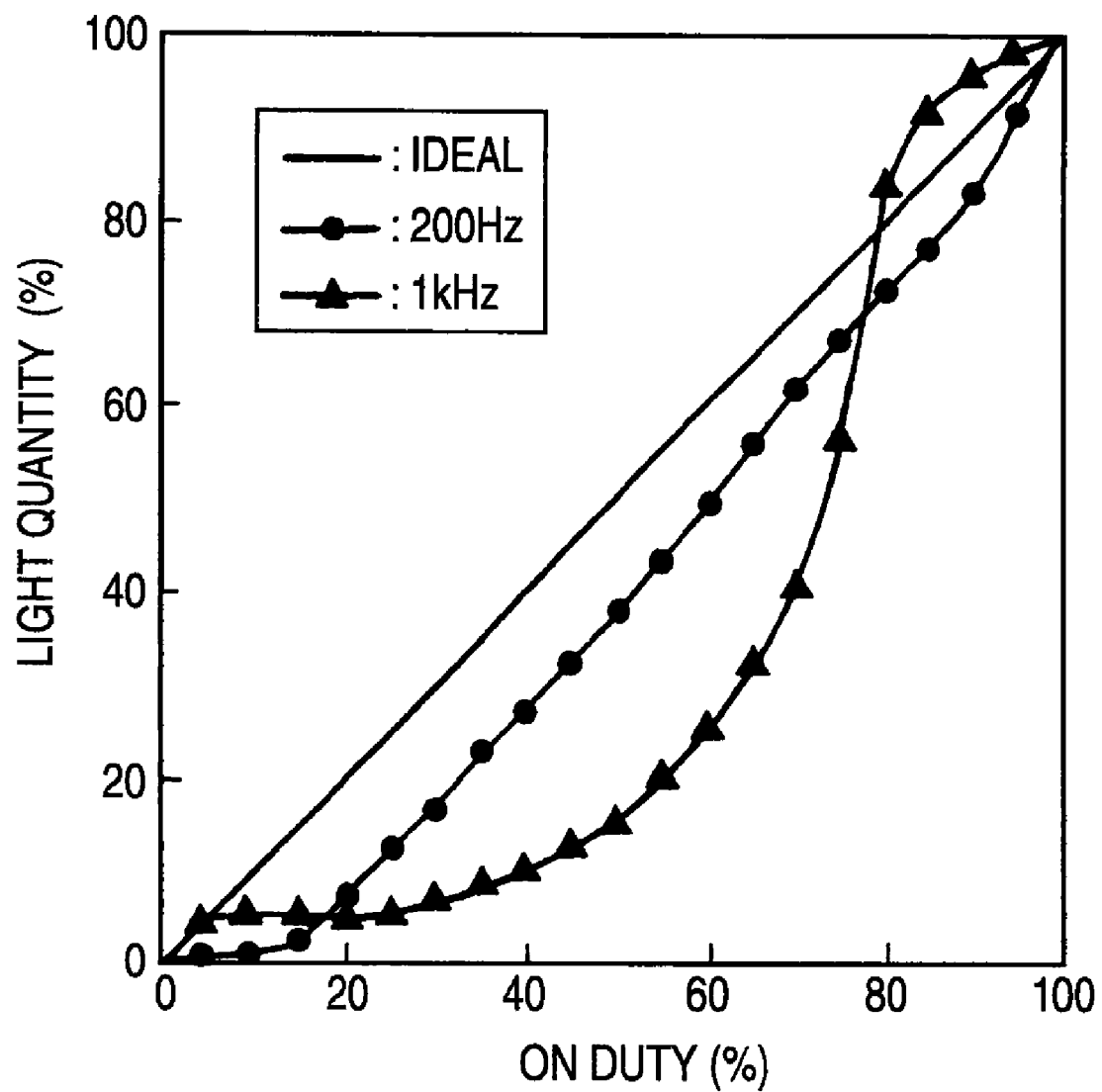
FIG. 5 is a characteristic graph showing the relationship between the on duty of the PWM signal and the light quantity.

Upon dimming (attenuation) of the light emitting diodes LED1, LED2 and LED3, a response delay occurs in the output current I of the switching regulators 52, 54 and 56 with respect to the PWM signal. Therefore, upon rising of the output current I of the switching regulators 52, 54 and 56, the light quantity for the area S1 shown by hatching decreases. Upon falling of the output current I of the switching regulators 52, 54 and 56, the light quantity for the area S2 shown by hatching increases. The linearity with respect to the light quantity decreases in accordance with an increase in difference between the area S1 and the area S2. Particularly, the effects by the difference between the area S1 and the area S2 increase in accordance with an increase in frequency of the PWM signal, resulting in reduction of the linearity with respect to the light quantity. For example, as shown in FIG. 5, the linearity with respect to the light quantity decreases more when the PWM signal is set at 1 kHz compared with the situation when the frequency of the PWM signal is set at 200 Hz.

In view of the circuit configuration of the switching regulators 52, 54 and 56, to enhance the linearity with respect to the light quantity, it is easier to reduce each of the areas S1 and S2 than to equalize the sizes of the areas S1 and S2 so as to reduce the difference between them.

The reduction of the linearity between the duty and the light quantity during dimming (attenuation) is mainly caused by the time delay tu, the transient state ts, and the time delay tf. The time delay tu is caused by the following fact. When the switching elements 32, 34 and 36 shift from OFF to ON, some of the electric charges in the capacitor C4 have been discharged. Thus, time is required until the capacitor C4 is rendered in a fully charged state. The transient state ts is caused by the following fact When an energy is discharged from the switching regulators 52, 54 and 56, some of the electric charges in the capacitor C5 have been discharged. Thus, time is required until the capacitor C5 is rendered in a fully charged state (the solid line arrow in FIG. 3). The time delay tf is caused by the following fact When the switching elements 32, 34 and 36 shift from ON to OFF, some of the electric charges in the capacitor C4 have been discharged to the transformer T1 based on the operations of the switching regulators 52, 54 and 56. In addition, time is required until a part of the electric charges in the capacitor C5 are discharged to the light emitting diodes LED1, LED2 and LED3 (the dotted line arrow in FIG. 3).

On the other hand, the increase in loss is mainly caused by the following fact. When the switching elements 32, 34 and 36 shift from OFF to ON, some of the electric charges in the capacitor C4 have been discharged. Thus, the capacitor C4 is fully charged. In addition, when an energy is discharged from the switching regulators 52, 54 and 56, some of the electric charges in the capacitor C5 have been discharged. Thus, the capacitor C5 is fully charged. The increase in loss in the switching regulators 52, 54 and 56 is caused by the following fact. The electric charges in the capacitors C4 and C5 are discharged during the OFF period of the PWM signal.

To prevent the foregoing, in this example, the following arrangement is adopted. When the feeding from the feed lines 20 to 26 is stopped by the switching operations (ON/OFF operations) of respective switching elements 32, 34 and 36, the control operation (current supply control operation) by the switching regulators 52, 54 and 56 and the control circuits 58, 60 and 62 is stopped. Thus, the electric charges resulting from supplying are stored during the feed stop period.

Specifically, stopping feeding to respective light units 14, 16 and 18 (the time of shift from the high level to the low level of the PWM signal) is detected by the control circuits 58, 60 and 62. At the time of this detection, an OFF signal is provided from the control circuits 58, 60 and 62 to each NMOS transistor of respective switching regulators 52, 54 and 56. Thus, each operation of respective switching regulators 52, 54 and 56 is forcibly stopped.

For example, in the control circuits 58, 60 and 62, to detect the stop period of feeding to respective light units 14, 16 and 18, the voltage at the node between the coil L2 and the capacitor C4 is monitored. It is assumed that when the voltage decreases from the voltage upon supplying to the set voltage, feeding from the input circuit 28 to respective light units 14, 16 and 18 is stopped. Thus, an OFF signal is provided from the control circuits 58, 60 and 62 to each NMOS transistor Q2 of respective switching regulators 52, 54 and 56. As a result, each operation of respective switching regulators 52, 54 and 56 is forcedly stopped. When each NMOS transistor Q2 of respective switching regulators 52, 54 and 56 is forcibly placed in an OFF state during the stop period of feeding to respective light units 14, 16 and 18, it is possible to prevent the discharge of electric charges stored in the capacitor C4.

For this reason, during the stop period of feeding to respective light units 14, 16 and 18, the voltage of the capacitor C4 in a generally fully charged state is applied to the control circuits 58, 60 and 62. Therefore, it is possible to keep the control circuits 58, 60 and 62 in a stand-by state. As a result, the control circuits 58, 60 and 62 can start up promptly from the time t0, which can make the time delay tu closer to 0.

During the stop period of feeding to respective light units 14, each NMOS transistor Q2 of respective switching regulators 52, 54 and 56 is forcibly placed in an OFF state. Thus, the discharge of electric charges stored in the capacitor C4 is prevented. As a result, it is possible to prevent an increase in loss resulting from discharge of electric charges in the capacitor C4 and a reduction of the linearity resulting from the time delay tu.

According to this example, the switching elements 32, 34 and 36 are disposed in the feed lines 20 to 26. Tuning on/and dimming (attenuation) of the light emitting diodes LED1, LED2 and LED3 are controlled by the ON/OFF operations of the switching elements 32, 34 and 36. Thus, this eliminates the need to provide a communication line in addition to the feed lines 20 to 26, which enables the stabilization of the whole system, reduction of the number of mounting steps or a reduction in cost.

Further, according to this example, during the stop period of feeding to respective light units 14, 16 and 18, each NMOS transistor Q2 of respective switching regulators 52, 54 and 56 is forcibly placed in an OFF state. As a result, it is possible to prevent an increase in loss resulting from discharge of electric charges in the capacitor C4 and a reduction of the linearity with respect to the light quantity resulting from the time delay tu.

Second Example

Figure 6:
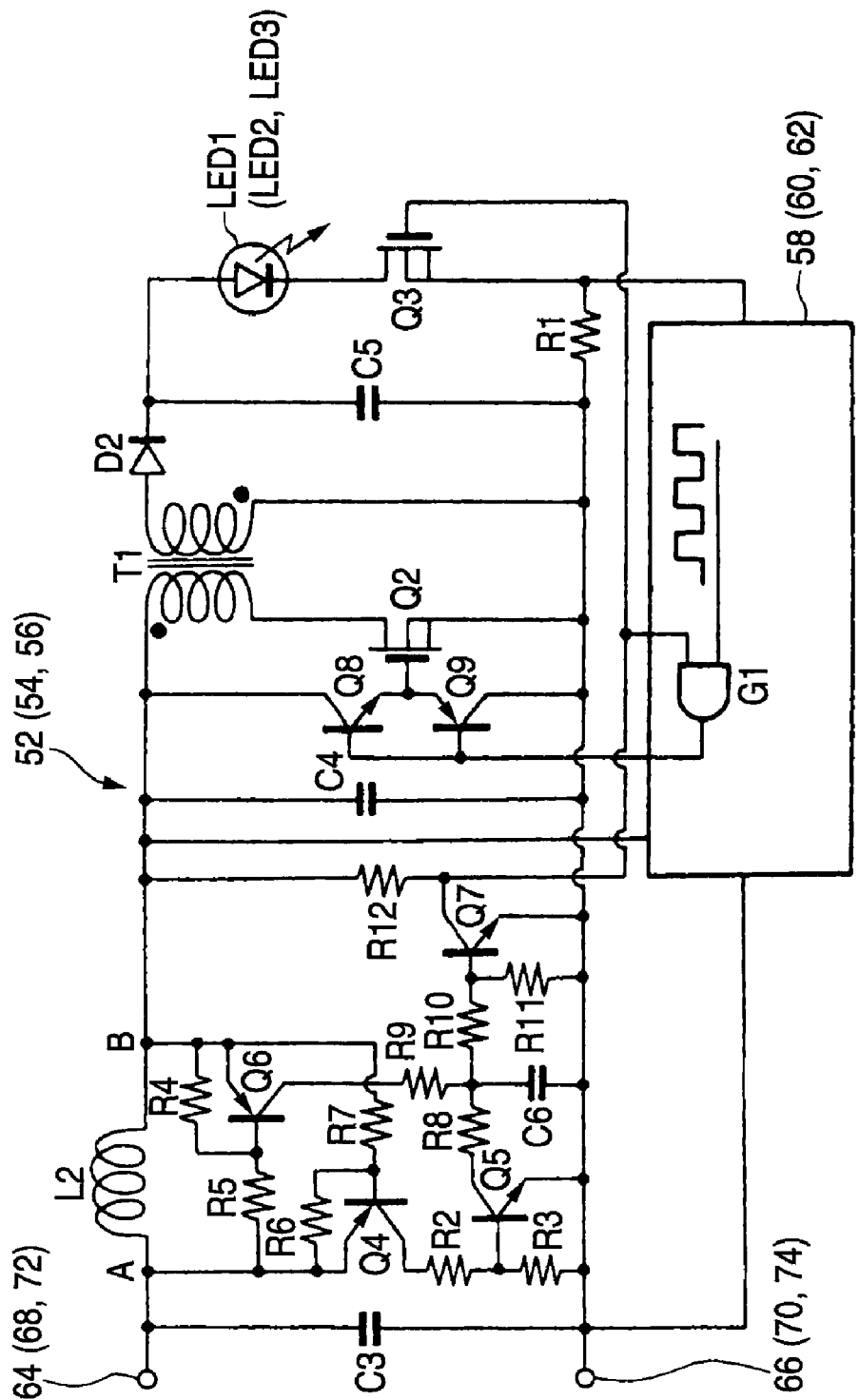
FIG. 6 is a circuit diagram showing a switching regulator and a control circuit according to a second example of the present invention.

A second example of the invention is described with reference to FIG. 6. In this example, an NMOS transistor Q3 is connected in series to the light emitting diode LED1 (LED2 or LED3). During the stop period of feeding to respective light units 14, 16 and 18, each NMOS transistor Q2 of respective switching regulators 52, 54 and 56, and the NMOS transistor Q3 serving as a second switching means connected in series to the light emitting diode LED1 (LED2 or LED3) are forcibly placed in an OFF state. Other configurations are the same as those in the first example.

In this example, the switching regulators 52, 54 and 56 and the control circuits 58, 60 and 62 cut off the feeding to the light emitting diodes LED1, LED2 and LED3 by the switching regulators 52, 54 and 56 with the OFF operation (switching operation) of the NMOS transistor Q3 when the feeding from the feed lines 20 to 26 is stopped. Thus, the electric charges resulting from the feeding are stored during the feed stop period.

The feed stop period detection means promptly detects the start and completion of the stop period of feeding to respective light units 14, 16 and 18, and a switch control means controls the ON/OFF operation (switching operation) of the NMOS transistor Q3. Respective switching regulators 52, 54 and 56 serve as the feed stop period detection means and the switch control means. The respective switching regulators 52, 54 and 56 include resistances R3 to R12 as resistance elements, a capacitor C6, a PNP transistor Q4, an NPN transistor Q5, a PNP transistor Q6 and an NPN transistor Q7. In addition, the switching elements control the operation of the NMOS transistor Q2 and include an NPN transistor Q8 and a PNP transistor Q9. Also, the control circuits 58, 60 and 62 include an AND gate G1 for providing a switching signal (pulse signal) according to the AND operation of the gate signal from the NMOS transistor Q3 and the switching signal (pulse signal) into the bases of the NPN transistor Q8 and the PNP transistor Q9. The NPN transistor Q8 and the PNP transistor Q9 are configured as a totem-pole transistor, such that the emitters are connected respectively to the gate of the NMOS transistor Q2 and the bases are respectively connected to the G1 of the AND gate G1.

With the foregoing configuration, when the PWM signal is at a high level, and feeding to respective light units 14, 16 and 18 is performed (as described below), the NMOS transistor Q3 is in an ON state. Thereafter, when feeding to respective light units 14, 16 and 18 is stopped (the PWM signal shifts from the high level to the low level), the current supply source is off. However, the coil L2 tries to supply a constant current. Accordingly, in the voltages at both ends of the coil L2, the voltage $V_A$ at a point A decreases more sharply compared with the voltage $V_B$ at a point B, resulting in $V_A < V_B$.

As a result, the PNP transistor Q6 is turned on in accordance with a decrease in base potential, so that electric charges are charged rapidly in the capacitor C6. When the voltage across the capacitor C6 sharply increases and exceeds the threshold value of the NPN transistor Q7, the NPN transistor Q7 is turned on. Thus, the gate signal from the NMOS transistor Q3 decreases to substantially 0 V. As a result; the NMOS transistor Q3 is turned off. At this step, the gate signal from the NMOS transistor Q3 becomes a low level (0 V). Accordingly, if the level of the switching signal (pulse signal) provided to the AND gate G1 becomes low level, a switching signal (pulse signal) of low level is provided from the AND gate G1. Thus, the PNP transistor Q9 is turned on, and the NMOS transistor Q2 is turned off. At this step, by making the discharge time constant in connection with the resistance R11 and the capacitor C6 larger, it is possible to keep the NPN transistor Q7 in an ON state during the feed stop period.

With the completion of the feed stop period, the feeding to respective light units 14, 16 and 18 starts (the PWM signal shifts from a low level to a high level). Accordingly, respective switching regulators 52, 54 and 56 are applied with a sufficient voltage, resulting in $V_A > V_B$. As a result, the NPN transistor Q6 is turned off in response to an increase in base potential. Meanwhile, the PNP transistor Q4 is turned on in response to a decrease in base potential. When the PNP transistor Q4 is turned on, the NPN transistor Q5 is turned on. Thus, the electric charges stored in the capacitor C6 are rapidly discharged through the resistor R8 and the NPN transistor Q5. When the voltage across the capacitor C6 sharply decreases, and becomes lower than the threshold value of the NPN transistor Q7, the NPN transistor Q7 is turned off Thus, the gate signal from the NMOS transistor Q3 shifts from a low level to a high level. Accordingly, the NMOS transistor Q3 is turned on.

The gate signal from the NMOS transistor Q3 is at a high level. Accordingly, if the level of the switching signal (pulse signal) entered to the AND gate G1 becomes a low level, a switching signal (pulse signal) of a high level is provided from the AND gate G1. Thus, the NPN transistor Q8 is turned on, and then the NMOS transistor Q2 is turned on. On the other hand, when the level of the switching signal (pulse signal) entered to the AND gate G1 becomes a low level, a switching signal (pulse signal) of a low level is provided from the AND gate G1. Thus, the NPN transistor Q8 is turned off, and the NMOS transistor Q2 is turned off.

During the period in which the gate signal from the NMOS transistor Q3 is at a high level, the NMOS transistor Q2 repeats the ON/OFF operation in response to a switching signal (pulse signal) provided from the AND gate G1. As a result, the light emitting diodes LED1, LED2 and LED3 emit light.

Third Example

According to a third example, during the stop period of feeding to respective light units 14, 16 and 18, each NMOS transistor Q2 of respective switching regulators 52, 54 and 56, and the NMOS transistor Q3 connected in series to the light emitting diodes LED1, LED2 and LED3 are forcibly placed in an OFF state. Accordingly, it is possible to prevent an increase in loss resulting from discharge of electric charges in the capacitor C4 and the capacitor C5, and a reduction of the linearity with respect to the light quantity resulting from the time delays tu, ts, and tf.

Figure 7:
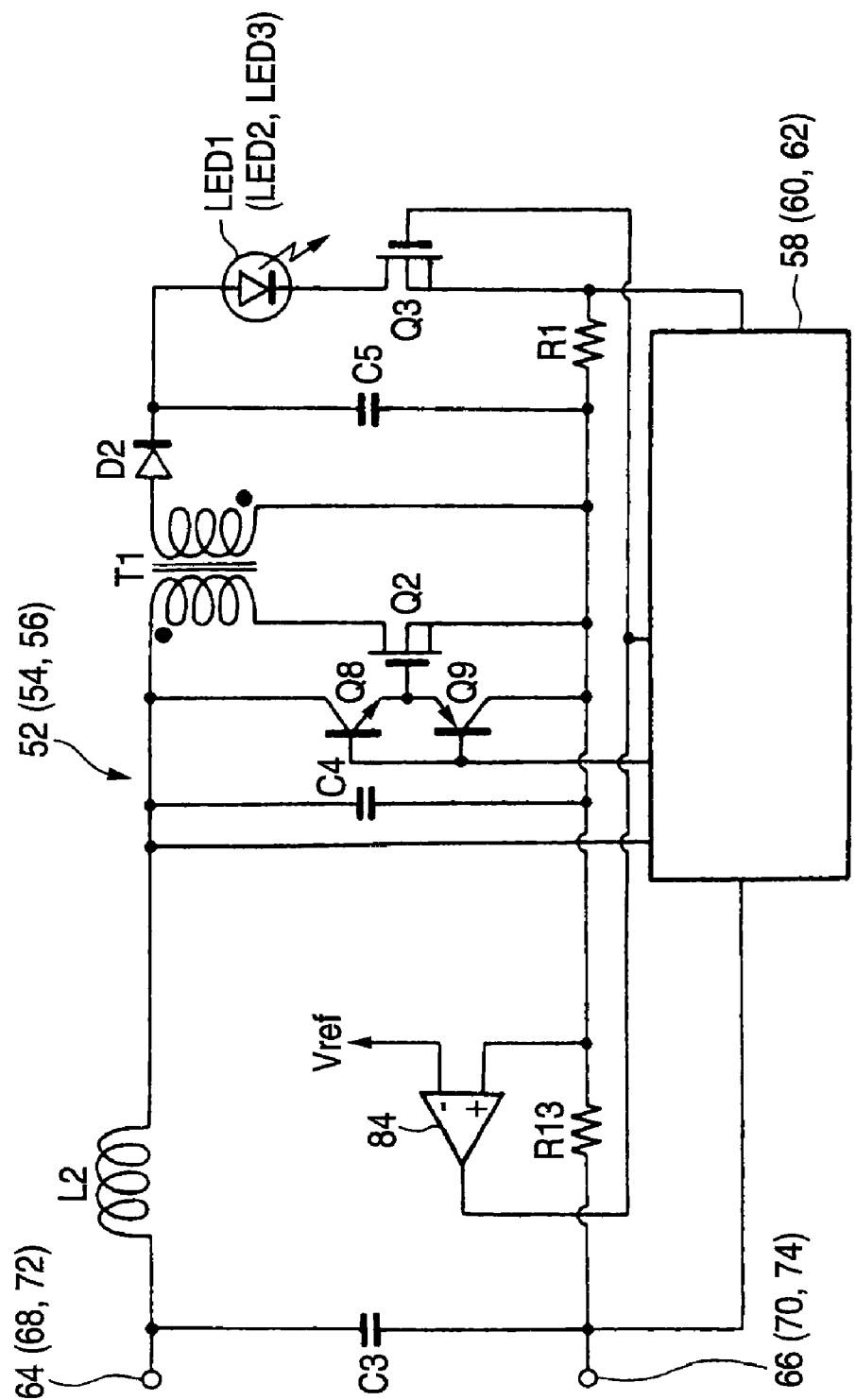
FIG. 7 is a circuit diagram showing a switching regulator and a control circuit according to a third example of the present invention.

The third example is described with reference to FIG. 7. In this example, the current of the light emitting diode LED1, LED2 or LED3 is detected. Thus, the period in which the detected current is 0 is referred to as the stop period of feeding to respective light units 14, 16 and 18. During the feed stop period, each NMOS transistor Q3 connected in series to the light emitting diode LED1 (LED2 or LED3) is forcibly placed in an OFF state. Other configurations are the same as those in the second example.

Specifically, in respective switching regulators 52, 54 and 56, there is a resistor R13 as a resistance element connected in series to the shunt resistance R1. In addition, the NPN transistor Q8 and the PNP transistor Q9 serve as a totem-pole transistor for controlling the operation of the NMOS transistor Q2. Further, an operational amplifier 84 compares the voltage across the resistor R13 and the reference voltage Vref, and then provides as an output a high level gate signal to the NMOS transistor Q3 when a current is flowing through the resistor R13 (when a current is flowing through the light emitting diodes LED1, LED2 and LED3). Then, the operational amplifier provides as an output a low level gate signal to the NMOS transistor Q3 when the current of the resistor R13 (the current of the light emitting diodes LED1, LED2 and LED3) becomes 0.

In the foregoing configuration, when the PWM signal is at a high level and feeding to respective light units 14, 16 and 18 is performed (as described below), the NMOS transistor Q3 is in an ON state. Thereafter, when the feeding to respective light units 14, 16 and 18 is stopped (the PWM signal shifts from a high level to a low level), the current flowing through the resistor R13 also becomes 0 as the current of the light emitting diodes LED1, LED2 and LED3 becomes 0. As a result, a low level gate signal is provided from the operational amplifier 84 to the NMOS transistor Q3, so that the NMOS transistor Q3 is placed in an OFF state.

With the completion of the feed stop period, feeding to respective light units 14, 16 and 18 is started (the PWM signal shifts from a low level to a high level). Accordingly, respective switching regulators 52, 54 and 56 are supplied with a sufficient voltage. The output from the operational amplifier 84 reverses from the low level to the high level in accordance with the start-up current. Thus, the NMOS transistor is placed in an ON state. Thereafter, the ON state of the NMOS transistor is maintained while a current flows through the light emitting diodes LED1, LED2 and LED3.

According to this example, during the stop period of feeding to respective light units 14, 16 and 18, each NMOS transistor Q3 connected in series to the light emitting diodes LED1, LED2 and LED3 is forcibly placed in an OFF state. Accordingly, it is possible to prevent an increase in loss resulting from discharge of electric charges in the capacitor C5, and a reduction of the linearity with respect to the light quantity resulting from the time delays tu, ts, and tf.

Fourth Example

Figure 8:
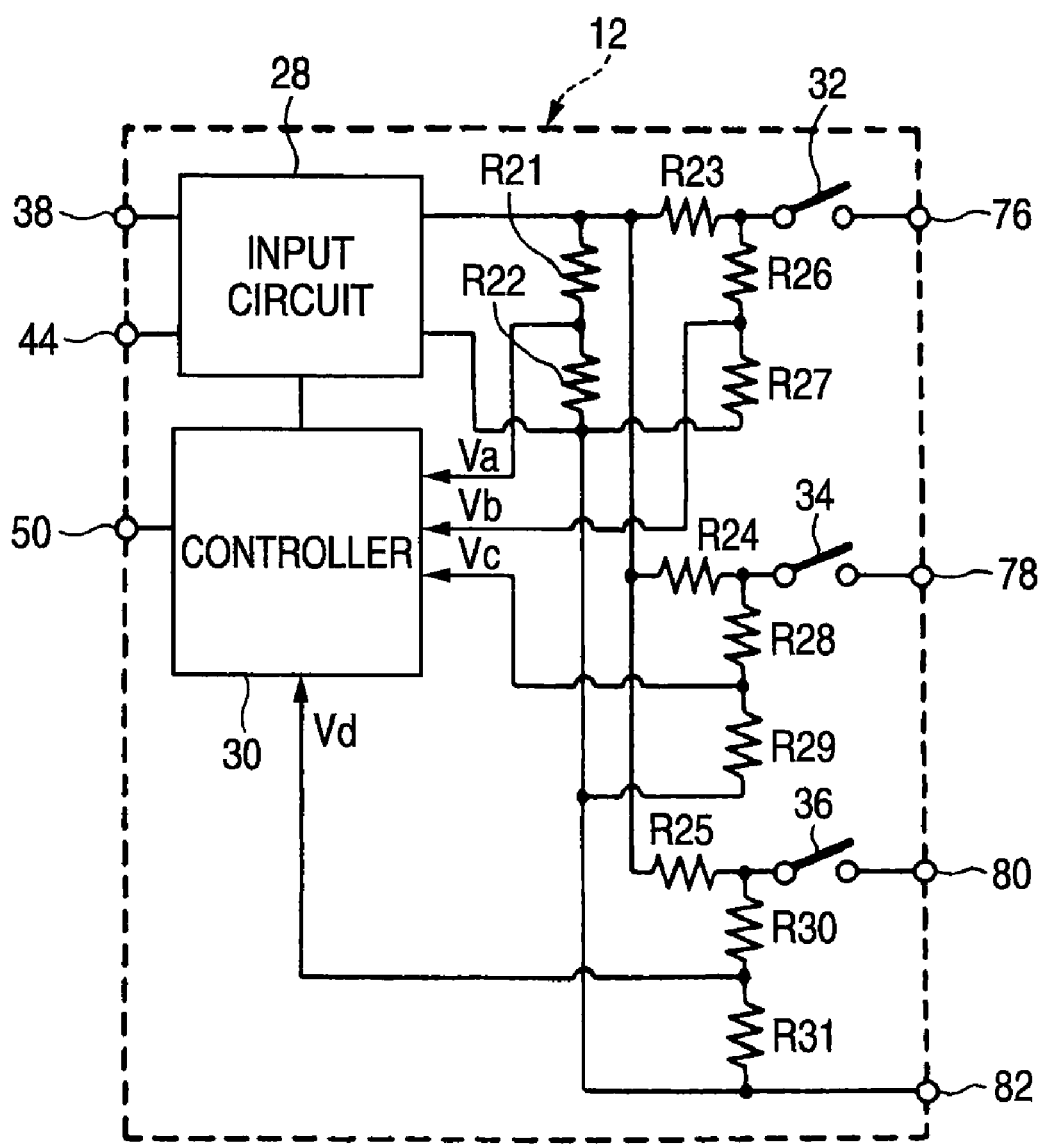
FIG. 8 is a circuit diagram showing a control unit according to a fourth example of the present invention.

A fourth example of the invention is described with reference to FIG. 8. In this example, it is determined whether respective light units 14, 16 and 18 are in an abnormal state in the control unit 12 without providing a communication line for transmitting abnormality information in the respective light units 14, 16 and 18 to the control unit 12. Other configurations can be the same as any of those of the first through third examples.

Resistors R21 to R31 are disposed in the control unit 12 as one element of an abnormality determining means for determining whether the respective light units 14, 16 and 18 are in an abnormal state based on the value of the current flowing through the switching elements 32, 34 and 36. The resistors R21 and R22 serve as resistance elements for dividing the output voltage of the input circuit 28, and providing the voltage Va obtained by voltage division as an output to the controller 30. The resistors R23, R24, and R25 serve as resistance elements for causing a voltage drop corresponding to the current supplied from the input circuit 28 to respective light units 14, 16 and 18, and applying the dropped voltage to the switching elements 32, 34 and 36. The resistors R26 and R27 serve as resistance elements for dividing the voltage dropped by the resistance R23, and providing the voltage Vb obtained by voltage division as an output to the controller 30. The resistors R28 and R29 serve as resistance elements for dividing the voltage dropped by the resistance R24, and providing the voltage Vc obtained by voltage division as an output to the controller 30. The resistors R30 and R31 serve as resistance elements for dividing the voltage dropped by the resistance R25, and providing the voltage Vd obtained by voltage division as an output to the controller 30.

The controller 30 sets the upper limit and the lower limit of the normal current value using the voltage Va as a reference value. The controller 30 performs a difference operation of voltage Va−voltage Vb so as to determine the current of the light unit 14. Also, the controller 30 performs a difference operation of voltage Va−voltage Vc so as to determine the current of the light unit 16. In addition, the controller 30 performs a difference operation of voltage Va−voltage Vd so as to determine the current of the light unit 18. When each current value of the respective light units 14, 16 and 18 exceeds the upper limit of the normal current value, it is determined that there is an abnormality, such as a short, in the respective light units 14, 16 and 18 including the feed lines 20 to 26. When each current value corresponding to the voltages Vb, Vc and Vd is smaller the lower limit of the normal current value, it is determined that there is an abnormality, such as an open, in the respective light units 14, 16 and 18 including the feed lines 20 to 26. Thus, each determination result is provided as abnormality information from the input/output terminal 50 to a display device (not shown) or the like.

The controller 30 with the resistors R21 to R31 is configured as an abnormality determining means for determining whether the respective light units 14, 16 and 18 are in an abnormal state based on the value of each current flowing through the switching elements 32, 34 and 36.

Upon obtaining each current of respective light units 14, 16 and 18, the voltages Va, Vb, Vc and Vd obtained by voltage division of the resistors are converted into digital signals by an AND converter in the microcomputer of the controller 30. Thus, difference operations (Va−Vb, Va−Vc, and Va−Vd) are performed using the microcomputer based on the converted digital signals. At this step, when the precision or the resolution of the A/D converter is required to be enhanced, such a configuration can be employed in which each voltage drop by the resistors R23, R24, and R25 is detected by a differential amplifier, and the detected value is converted into a digital signal by the A/D converter in the microcomputer.

As with the first through third examples, the need to provide a communication line in addition to the feed lines 20 to 26 is eliminated. This can enable standardization of the whole system, reduction of the number of mounting steps, and cost reduction. In addition, each current flowing through the feed lines 20 to 26 is detected without connecting the respective light units 14, 16 and 18 and the control unit 12 through a communication line. As a result, it is possible to detect each current flowing through the feed lines 20 to 26 and whether the respective light units 14, 16 and 18 are in an abnormal state in the control circuit 12.

In the respective examples, the switching elements 32, 34 and 36 are disposed in hot lines connected to the feed lines 20, 22 and 24. However, the following configuration also can be adopted. The feed line 20 can be configured as a common feed line shared among respective light units 14, 16 and 18. The feed lines 22, 24 and 26 are configured as GND side feed lines. Thus, the switching elements 32, 34 and 36 are disposed in GND lines connected to respective GND side feed lines.

Further, each AND gate G1 in the control circuits 58, 60 and 62 denotes a function. It is possible to add the function of the AND gate G1 to the control program of the control circuits 58, 60 and 62 instead of a logic device.

Upon providing abnormality information from the input/output terminal 50 for inputting vehicle information, the information also can be provided as a flashing signal for turning on and off an abnormality display lamp or the like.

Although particular examples of the present invention have been described, it will be readily evident to those skilled in the art that various changes and modification may be made therein without departing from the present invention. Accordingly, other implementations are within the scope of the claims.

What is claimed is:

1. A light emitting device comprising:
a plurality of light units each including:
a semiconductor light source; and
a current supply control means for controlling supply of current to the semiconductor light source; and
a control unit including:
a control signal generation means for generating and providing a control signal; and
a plurality of first switching means for controlling feeding from a DC power source to a corresponding one of the light units in response to the control signal, wherein each of the first switching means is coupled to a corresponding one of the light units through a feed line.

2. The light emitting device according to claim 1, arranged so that, when the feeding from the feed line is stopped by a switching operation of each of the first switching means, the current supply control means stops a control operation thereof and stores electric charges resulting from the feeding during a feed stop period.

3. The light emitting device according to claim 1 wherein each of the light unit further includes:
a second switching means connected in series to the semiconductor light source; and
a switch control means for controlling the second switching means in an OFF state during a feed stop period when the feeding from the feed line is stopped by a switching operation of each of the first switching means, wherein the current supply control means stores electric charges resulting from the feeding during the feed stop period.

4. The light emitting device according to claim 2, wherein the current supply control means includes a noise filtering coil for removing a switching noise from the feeding line and is arranged to detect stoppage of the feeding from the feed line by the switching operation of each of the first switching means from a change in applied voltage of the noise filtering coil.

5. The light emitting device according to claim 1 wherein the control unit further includes an abnormality determining means for determining whether each of the light units is in an abnormal state based on a value of current flowing through each of the first switching means.

6. A light emitting device comprising:
a plurality of light units each including:
a semiconductor light source; and
a current supply control means for controlling supply of current to the semiconductor light source; and
a control unit including:
a control signal generation means for generating and providing a control signal; and
a plurality of first switching means for controlling feeding from a DC power source to a corresponding one of the light units in response to the control signal, wherein each of the first switching means is coupled to a corresponding one of the light units through a feed line,
wherein each of the light unit further includes:
a second switching means connected in series to the semiconductor light source; and
a switch control means for controlling the second switching means to be in an OFF state during a feed stop period when the feeding from the feed line is stopped by a switching operation of each of the first switching means, wherein the current supply control means stores electric charges resulting from the feeding during the feed stop period, wherein the current supply control means includes a noise filtering coil for removing a switching noise from the feed line and is arranged to detect stoppage of the feeding from the feed line by the switching operation of each of the first switching means from a change in applied voltage of the noise filtering coil and wherein the control unit further includes an abnormality determining means for determining whether each of the light unit is in an abnormal state based on a value of current flowing through each of the first switching means.

* * * * *